United States Patent [19]

Nishimura

[11] 4,343,240

[45] Aug. 10, 1982

[54] TROLLEY

[75] Inventor: Yosaku Nishimura, Osaka, Japan

[73] Assignee: Vital Kogyo Kabushiki Kaisha, Osaka, Japan

[21] Appl. No.: 203,905

[22] Filed: Nov. 4, 1980

[30] Foreign Application Priority Data

Mar. 11, 1980 [JP] Japan .............................. 55-31357[U]

[51] Int. Cl.³ ............................ B61B 3/00; B61B 7/00
[52] U.S. Cl. ...................................................... 105/154
[58] Field of Search ......................................... 105/154

[56] References Cited

U.S. PATENT DOCUMENTS

| | | | |
|---|---|---|---|
| 1,151,226 | 8/1915 | Steedman | 105/154 |
| 1,446,463 | 2/1923 | Hoffman | 105/154 |
| 2,645,187 | 7/1953 | Guadagna | 105/154 |
| 2,744,472 | 5/1956 | Symons | 105/154 |

Primary Examiner—Richard A. Bertsch
Attorney, Agent, or Firm—Holman & Stern

[57] ABSTRACT

A trolley suspended on a rail comprising spaced side plates having rollers facing each other on the upper part and coaxial bushings on the lower part, a hanger plate suspended midway between the side plates by a stay rod which passes through said bushings, wherein the stay rod is coupled with a bushing on one of the side plates by a head pin passing through borings provided on said bushing and on one end of the stay rod, and the head of said pin is held down by a spring retainer which is in releasable engagement with the bushing.

6 Claims, 4 Drawing Figures

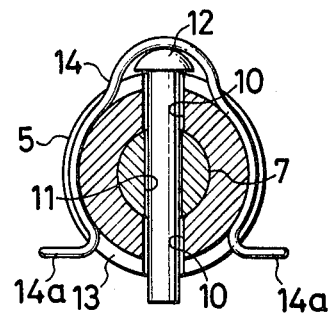
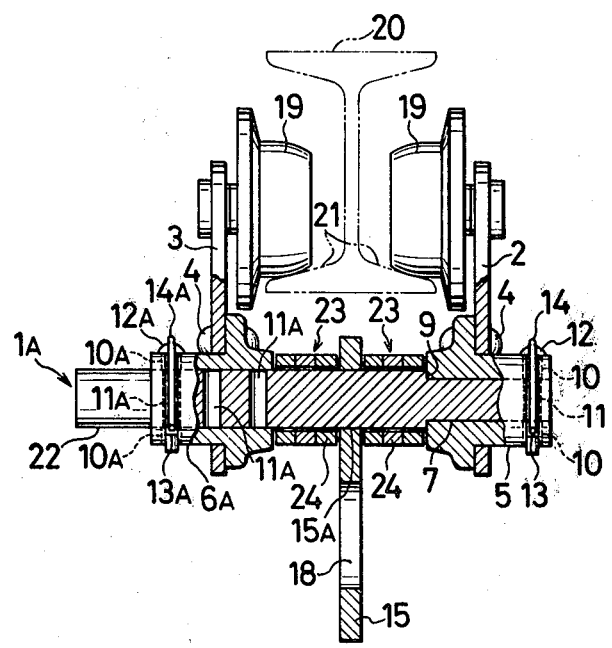

TROLLEY

BACKGROUND OF THE INVENTION

A trolley with a hanger plate to convey a hung article, travelling along the horizontal track on the lower protrusion of a crossbeam such as an I-shaped beam, comprises two side plates coupled by a stay rod which suspends a hanger plate.

Each of said side plates supports face to face a pair of rollers which run on the track. The space between the side plates is adjustable so that the trolley can be used on I-beams which may vary in size. A hanger plate must be coupled to the stay rod exactly midway between both the side plates to balance the load on the two tracks of an I-beam each time said adjustment is applied.

Assemblage and the above described spacing adjustment of the side plates of the known and customary trolleys always require tools for tightening and loosening the bolts and nuts which are used to fix the stay rod inserted in the bushes mounted on the side plates.

Unless such tools are provided on the spot, however, assemblage of a trolley and its engagement with a rail are impossible. Furthermore, spacing adjustment of the side plates and positioning of the hanger plate on the stay rod are not easy to do.

SUMMARY OF THE INVENTION

This invention relates to an article conveyor trolley, which may be described as a type of trolley comprising side plates supporting a pair of rollers that run on the track of a rail comprising an I-beam, a stay rod spacing said side plates, and a hanger plate coupled to said stay rod at the center of said space.

It is an object of the present invention to provide a new and improved trolley of the aforementioned type, which can be assembled without use of tools for application to a wide variety of rail size.

It is another object of the present invention to provide a trolley which permits spacing adjustment of the side plates without the use of tools so that rollers of the trolley are brought into proper contact with the tracks of a rail.

It is another object of the present invention to provide a trolley which permits coupling of an article hanger plate to the stay rod at an appropriate position between both the side plates without the use of tools.

Characteristics of the invention are illustrated by way of an embodiment described below in conjunction with the accompanying drawings.

BRIEF DESCRIPTION OF THE DRAWINGS

FIG. 3 is a cross-sectional view taken along the line III—III of FIG. 1; and

FIG. 4 is a partial cross-sectional front view of the trolley shown in FIG. 1 according to an alternative embodiment of the invention.

DESCRIPTION OF THE PREFERRED EMBODIMENTS

Figure 1:
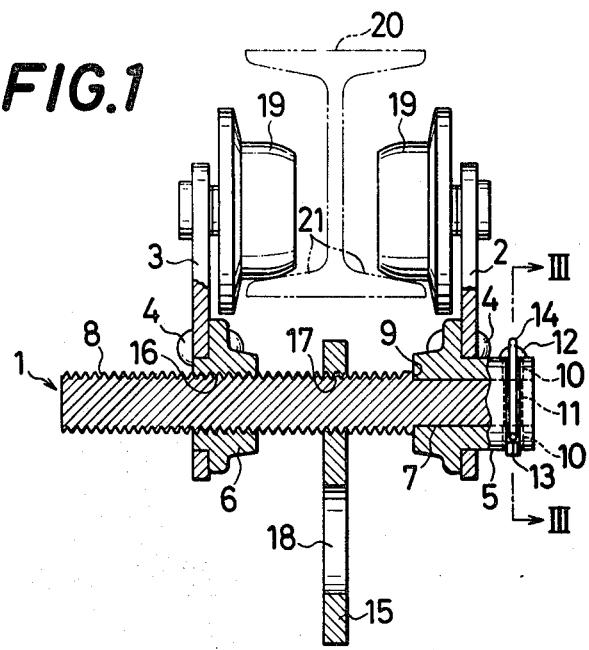
FIG. 1 is a partial cross-sectional front view of the trolley according to a preferred embodiment of the present invention.
Figure 2:
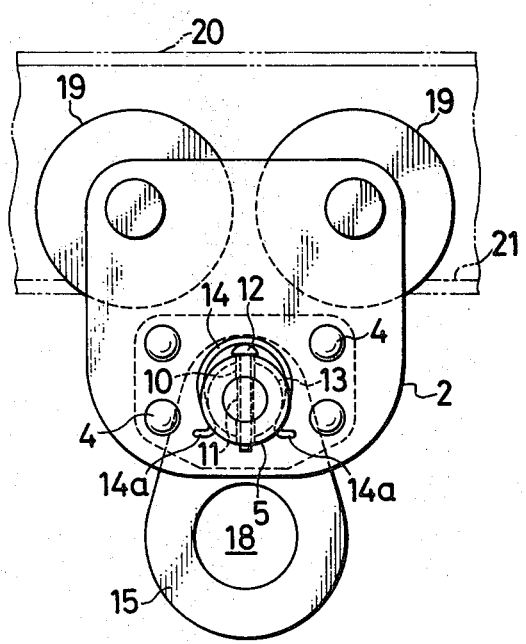
FIG. 2 is a right elevational side view of the trolley shown in FIG. 1.

FIGS. 1, 2 and 3 show an embodiment according to the present invention. Reference number 1 designates a stay rod passing through the lower part of a fixed side plate 2 and an adjustable side plate 3 at regular spaces. Said stay rod 1 is suspended by bushings 5 and 6 mounted via rivets 4 and 4 to the fixed side plate 2 and adjustable side plate 3 respectively. The part of said stay rod 1, which is inserted in bushing 5 on the fixed side plate 2, is formed as a journal 7, and the remaining periphery of stay rod 1 is provided with screw thread 8. Reference number 9 designates a shoulder shaped at the boundary between the two. Bushing 5 which protrudes from fixed side plate 2 and journal 7 which is housed in bushing 5 are both provided with diametrically passing borings 10 and 11 respectively, and are held together with the borings aligned via a head pin 12 which is inserted with the head upward in said borings 10 and 11. Reference number 13 designates an annular groove which is provided passing over boring 10 on the periphery of bushing 5 to receive a Ω-shaped elastic retainer 14 such as a spring clip having a contour of at least a hemicycle and an opening with both the ends 14a and 14a bent outward, which is elastically engaged with said annular groove 13 and holds down the head of pin 12 to retain the pin 12 in the borings 10 and 11. In the embodiment as represented in FIGS. 1 and 2, a wire spring clip is employed as an elastic holder 14, but a flat spring shaped similar to the spring clip may be applied to a wider annular groove 13 provided on bushing 5.

FIG. 3 represents another shape of an elastic holder 14 which has upwardly convex curved section more closely mating the head shape of pin 12 at the middle of the aforementioned circular contour, to ensure more rigid engagement with annular groove 13.

Bushing 6 fixed to the lower part of adjustable side plate 3 and a hanger plate 15 which is centrally suspended between bushings 5 and 6 on stay rod 1, are provided with female screw threads 16 and 17 respectively, both mating screw thread 8 on stay rod 1, so that an axial position of stay rod 1 is shifted in conjunction with bushing 6 on adjustable side plate 3 by means of rotating stay rod 1 for adjustment with respect of fixed side plate 2. An axial position of stay rod 1 in conjunction with bushing 5, that is fixed side plate 2, is not shifted by a rotation of stay rod 1, as boundary stage 9 between thread 8 and journal 7 of stay rod 1 is in contact with the inside end of bushing 5 on fixed side plate 2, journal 7 being supported to rotate freely in a hole in bushing 5.

Reference number 18 designates a hole for hanging an article on the lower part of hanger plate 15.

Each pair of rollers 19 and 19 is supported freely rotatable on the inside upper part of fixed side plate 2 and adjustable side plate 3 respectively, and said rollers 19 and 19 are in rolling engagement on the protrusions 21 and 21 respectively of rail 20 to travel along rail 20.

In the use of the present invention as described above and position it on rail 20, thread 8 on stay rod 1 is first screwed into female screw 16 threaded in bushing 6 on adjustable side plate 3 in order to determine a position of adjustable side plate 3 according to the width of rail 20 on which the trolley is to be engaged, using boring 11 on journal 7 of stay rod 1 as a fiducial point for example, and thereafter a position of hanger plate 15 is set by screwing hanger plate 15 into thread 8 on stay rod 1 from journal 7 also using boring 11 as a fiducial point.

Upon positioning of adjustable side plate 3 and hanger plate 15, rollers 19 and 19 which are provided on the inside upper part of adjustable side plate 3 are mounted on either side of lower protrusion 21 of rail 20, and thereafter rollers 19 and 19 which are provided on the inside upper part of fixed side plate 2 are also mounted on the other side of lower protrusion 21 of rail 20, inserting journal 7 of stay rod 1 into bushing 5 on fixed side plate 2. Boring 11 on journal 7 and longitudinal boring 10 on bushing 5 are brought in alignment by rotating stay rod 1, and then head pin 12 is inserted into both the boring 10 and 11 with the pin head upward so that stay rod 1 and fixed side plate 2 are rigidly coupled.

Said head pin 12 passing through borings 10 and 11 is definitely prevented from falling off due to an external force such as longitudinal vibration extended to the trolley, by means of the head of pin body 12 being pressed down with elastic holder 14 which is guided to slide into annular groove 13 over said pin body 12 by holding with one hand either of the opening ends 14a of elastic holder 14 and pressing down with the other hand the center of circular contour of said holder 14 to elastically deform and widen the opening between opening ends 14a and 14a.

As described above, assemblage of a trolley and adjustment of the space between both the side plates 2 and 3 can always be freely effected by handwork alone without the use of tools, by means of screwing thread 8 on stay rod 1 into adjustable side plate 3 and hanger plate 15, and of coupling bushing 5 of fixed side plate 2 to journal 7 of stay rod 1 with head pin body 12, the head of which is rigidly held down by elastic holder 14.

FIG. 4 represents an alternative embodiment of the present invention, using the same reference numbers for identical parts in connection with FIG. 1 for the sake of clarity. A journal 22 is provided instead of thread 8 on stay rod 1 shown in FIG. 1, and bushing 6A on adjustable side plate 3 is designed identical to bushing 5 on fixed side plate 2, both side plates 2 and 3 being coupled to journal 7 and 22 respectively of stay rod 1A by head pin bodies 12 and 12A respectively, and the heads of said pin bodies 12 and 12A respectively being held down with elastic holders 14 and 14A respectively fitted to annular grooves 13 and 13A respectively provided on bushings 5 and 6A respectively. Positioning of journal 22 of stay rod 1A and hanger plate 15 which is suspended via a plain hole 15A can be accomplished by providing in the spaces between hanger plate 15 and both the bushings 5 and 6A an equal number of collars 23 and 23 having the corresponding length which is determined by the space between both the side plates 2 and 3.

Adjustment of the space between the side plates 2 and 3 is effected by changing a combination of boring 10A provided on bushing 6A and a plural number of parallel borings 11A provided on journal 22 of stay rod 1A, and concurrently adjusting the length of collars 23 and 23 provided between hanger plate 15 and both bushings 5 and 6A. Adjustment of collar 23 can be conveniently performed by changing the number of small collars 24 cut to adequate length.

As described above, assemblage of a trolley and adjustment of the space between both the side plates 2 and 3 can always be effected by handwork alone without the use of tools, by coupling both the side plates 2 and 3 with journal 7 and 22 respectively with head pin bodies 12 and 12A respectively, the head of said pin bodies being rigidly held down by elastic holders 14 and 14A respectively, and positioning hanger plate 15 with collars 23 and 23, or 24.

As has been clarified above, the present invention effectively provides safe, certain and extremely easy means of handling, comprising solely handwork without the use of any tools, for not only assemblage and disassembly of a trolley but also spacing adjustment of both the side plates.

What is claimed is:

1. In a trolley having fixed and adjustable side plates supported in spaced relationship at a given distance by a stay rod passing through bushings fixed to the lower part of the side plates, a hanger plate coupled to the stay rod between said bushings, and rollers rotatably mounted on the upper part of the side plates, the improvement comprising the bushing on the fixed side plate is provided with a bearing hole, a journal formed at one end of the stay rod insertable into said hole for free rotation therein, said fixed side plate bushing and journal having diametrical aligned borings therethrough respectively, a pin having a head at one end removably inserted in said borings to couple said stay rod and fixed side plate bushing together an annular groove on the outer surface of said fixed side plate bushing aligned with said borings, an elastic holder releasably engaging in said groove and engaging said head of said pin to retain said pin in said borings, and an internal screw thread through the adjustable side plate bushing, and an external screw thread on the stay rod, other than the part formed as said journal, cooperatively engaging in said internal screw thread.

2. A trolley according to claim 1 wherein the hanger plate is provided with an internal screw thread in cooperating threaded engagement with said extended screw thread on said stay rod.

3. A trolley according to claim 1 wherein said elastic holder comprises a circular spring wire having an opening to facilitate insertion in and removal from said groove.

4. A trolley according to claim 1 wherein said elastic holder comprises a circular plate spring having an opening to facilitate insertion in and removal from said groove.

5. In a trolley having fixed and adjustable side plates supported in spaced relationship at a given distance by a stay rod passing through the bushings fixed to the lower part of the side plates, a hanger plate coupled to the stay rod between said bushes, and rollers rotatably mounted on the upper part of the side plates, the improvement wherein the bushing on the adjustable side plate is provided with a diametrical boring, and the axial stay rod is provided with a plurality of diametrical borings in spaced relationship along the part thereof supported by said adjustable side plate bushing, a pin having a head on one end removably inserted into said boring in said bushing and one of said borings in said stay rod when aligned with said boring in said bushing, an elastic holder for retaining said pin in said inserted position, an annular groove on the outer surface of said bushing, said holder releasably engaging in said groove and engaging said head of the pin.

6. A trolley according to claim 5 wherein the hanger plate has a bearing hole and the axial stay rod between the bushings on the fixed side plate and adjustable side plate passes through said bearing hole, and a plurality of removable spacing collars are provided on said stay rod between said hanger plate and the bushings to adjustably retain said hanger plate in fixed position during use.

* * * * *